United States Patent [19]

Blum et al.

[11] Patent Number: 5,134,188
[45] Date of Patent: Jul. 28, 1992

[54] AQUEOUS SOLUTIONS OR DISPERSIONS OF HYDROXY-FUNCTIONAL COPOLYMERS AND A PROCESS FOR THEIR PRODUCTION

[75] Inventors: Harald Blum; Volker Schneider, both of Wachtendonk; Peter Höhlein, Kempen, all of Fed. Rep. of Germany

[73] Assignee: Bayer Aktiengesellschaft, Leverkusen, Fed. Rep. of Germany

[21] Appl. No.: 675,388

[22] Filed: Mar. 26, 1991

[30] Foreign Application Priority Data

Apr. 4, 1990 [DE] Fed. Rep. of Germany ....... 4010794

[51] Int. Cl.$^5$ ..................... C08L 37/00; C08F 222/40; C08F 222/02; C08F 220/10
[52] U.S. Cl. ..................... 524/548; 526/262; 526/318.25; 526/328.5
[58] Field of Search ............ 524/548; 526/262

[56] References Cited

U.S. PATENT DOCUMENTS 3,676,404  7/1972  Nield ................................. 526/262
4,452,948  6/1984  Marrion et al. ...................... 525/207
4,816,523  3/1989  Tsujimoto et al. ................. 525/380

Primary Examiner—Joseph L. Schofer
Assistant Examiner—Wu C. Cheng
Attorney, Agent, or Firm—Joseph C. Gil; Thomas W. Roy

[57] ABSTRACT

The present invention relates to aqueous solutions or dispersions of hydroxy-functional copolymers containing imide structural units corresponding to the formula

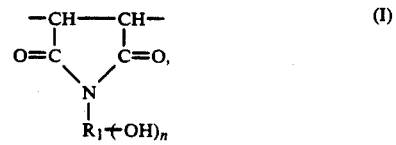

The present invention also relates to a process for the production of these aqueous solutions or dispersions of hydroxy-functional copolymers containing imide structural units by reacting anhydride-functional and optionally carboxyl-functional copolymers corresponding to the hydroxy-functional copolymers with aminoalcohols and optionally aminocarboxylic acids. In a further embodiment of the process the hydroxy-functional copolymers may be reacted with lactones resulting in ring opening and the formation of ester groups.

6 Claims, No Drawings

AQUEOUS SOLUTIONS OR DISPERSIONS OF HYDROXY-FUNCTIONAL COPOLYMERS AND A PROCESS FOR THEIR PRODUCTION

BACKGROUND OF THE INVENTION

1. Field of the Invention

This invention relates to aqueous solutions or dispersions of hydroxyfunctional copolymers containing imide structural units and to a process for their production.

2. Description of the Prior Art

Binders based on acrylate copolymers dissolved in organic solvents in combination with crosslinking resins are distinguished by a number of excellent properties, including gloss retention and resistance to hydrolysis, weathering and yellowing. Other valuable paints are obtained by the incorporation of hydroxyl groups and are used in large quantities for paints, coatings, adhesives, printing inks and sealants.

To introduce hydroxyl groups, hydroxy-functional monomers, such as hydroxyethyl acrylates, are normally incorporated. To obtain high crosslink densities, relatively large quantities of hydroxy-functional monomers have to be incorporated such that the range of variation of the other monomers is restricted and, in addition, relatively expensive products are obtained.

Polyimides can be produced, for example, from bisanhydrides, such as pyromellitic anhydride, and from diamines. They are distinguished, inter alia, by excellent electrical insulation properties and by high long-term thermal stability. A serious disadvantage of the polyimides which are suitable for use on an industrial scale is their poor solubility. Large quantities of physiologically hazardous solvents, such as dimethyl acetamide, have to be used.

The economics of the coating compositions produced from the binders can be seriously impaired by the solvents used because the solvents are not incorporated in the coatings and have to be additionally eliminated, for example by burning, to reduce environmental pollution to the extent possible.

By contrast, water-based paints containing water dilutable or water soluble binders have the advantage that they contain relatively small quantities of organic solvents so that there is no need for expensive absorption units or furnaces.

An object of the present invention is to provide hydroxy-functional copolymers containing imide structural units dissolved or dispersed in water which are easy to prepare and, by virtue of a widely variable composition, would be suitable for various applications, for example in, or as, aqueous coating compositions, sealants or adhesives.

This object may be achieved by reacting special anhydride-functional and optionally carboxyl-functional copolymers with suitable aminoalcohols and optionally aminocarboxylic acids to form uncrosslinked hydroxy-functional copolymers containing imide structural units. These products can be diluted with water after at least partial neutralization of the carboxyl groups so that the copolymers are dissolved or dispersed in water.

That this object may be achieved is surprising because anhydride-functional copolymers are known to react with aminoalcohols to form crosslinked insoluble products. Crosslinking is caused by the anhydrides reacting very quickly with amino groups and also with hydroxyl groups to form amide or ester bonds.

This reaction principle is described, for example, in EP-A-48,128 for the production of two-component binders which cure rapidly to crosslinked products after mixing of the individual components.

SUMMARY OF THE INVENTION

The present invention relates to aqueous solutions or dispersions of hydroxy-functional copolymers wherein the copolymers contain per 100 parts by weight a) 1 to 70 parts by weight of structural unit I

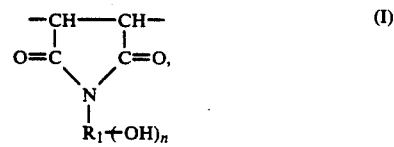

b) a total of 2 to 25 parts by weight of structural units II, III, IV and/or V, which are at least partly present in neutralized form

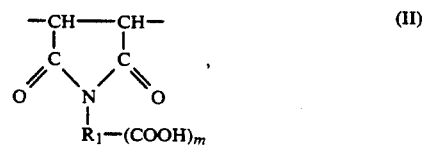

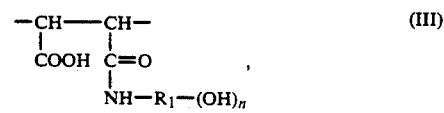

c) 1 to 75 parts by weight of structural unit VI

d) 15 to 95 parts by weight of structural unit VII

e) 0 to 15, preferably 0 to 5 parts by weight of structural units derived from other polyolefinically unsaturated monomers, wherein the sum of components a) to e) is 100, based on the total weight of components a) to e), and wherein n is 1, 2 or 3, m is 1 or 2, $R_1$ represents an aliphatic, cycloaliphatic, araliphatic or aromatic $C_{2-20}$ hydrocarbon radical which may contain one or more fluorine or chlorine heteroatoms, or one or more oxygen or nitrogen heteroatoms in the form of ether, ester, amide, imide, urethane, urea, keto and nitrile groups, $R_2$ represents hydrogen or a methyl group, $R_3$ represents an aliphatic $C_{2-15}$ hydrocarbon cycloaliphatic $C_{5-10}$ hydrocarbon radical, an araliphatic $C_{7-18}$ hydrocarbon radical, an aromatic $C_{6-12}$ hydrocarbon radical, chlorine, fluorine, a nitrilo group or a $C_{2-12}$ hydrocarbon radical containing one or more oxygen, sulfur or nitrogen heteroatoms in the form of ether, ester, amide, urethane, urea, thioester, thioether, oxirane, ketone, lactam or lactone groups, $R_4$ represents hydrogen or, together with $R_3$ and the two carbon atoms of structural unit VI represents a cycloaliphatic radical, $R_5$ represents hydrogen, a methyl or ethyl group, chlorine or fluorine and $R_6$ represents an aliphatic or cycloaliphatic $C_{1-18}$ hydrocarbon radical optionally containing oxygen, sulfur or nitrogen heteroatoms.

The present invention also relates to a process for the production of these aqueous solutions or dispersions of hydroxy-functional copolymers containing imide structural units by A) reacting anhydride-functional and optionally carboxyl-functional copolymers corresponding to the hydroxy-functional copolymers with aminoalcohols corresponding to formula VIII.

$$H_2N-R_1-(OH)_n \quad \text{(VIII)}$$

and optionally with aminocarboxylic acids corresponding to formula IX $$H_2N-R_1(COOH)_m \quad \text{(IX)}$$

wherein $R_1$, n and m are as defined above, at a temperature of 100° to 200° C., while maintaining an equivalent ratio of amino groups to anhydride groups of 0.8:1 to 2:1 during the reaction, B) azeotropically distilling off the water of reaction during the reaction or subsequently, C) neutralizing at least a portion of the carboxyl groups, D) dissolving or dispersing the polymer solution in water during or subsequent to step C) and E) distilling off at least a portion of any remaining organic solvent.

Further, the present invention relates to another embodiment of this process which is characterized in that the hydroxy-functional polyimide copolymers obtained in accordance with step A) are reacted before step C) with 0.05 to 5 moles lactones per mole of hydroxyl groups present in the polyimide copolymers resulting in ring-opening and the formation of ester groups.

DETAILED DESCRIPTION OF THE INVENTION

The preferred solutions or dispersions according to the invention contain hydroxy-functional copolymers which contain a) 8 to 35 parts by weight of structural unit I, b) a total of 3 to 15 parts by weight of structural units II, III, IV and/ or V which are at least partly present in neutralized form, c) 5 to 50 parts by weight of structural unit VI and d) 20 to 80 parts by weight of structural unit VII, wherein the total of these parts is 100 and n is 1, 2 or 3, m is 1, $R_1$ represents an aliphatic $C_{2-12}$ hydrocarbon radical optionally containing ester groups, $R_2$ represents hydrogen or a methyl group, $R_3$ represents an optionally substituted phenyl radical, $R_4$ represents hydrogen, $R_5$ represents hydrogen or a methyl group and $R_6$ represents an aliphatic $C_{1-10}$ hydrocarbon radical optionally containing one or more oxygen heteroatoms.

Among the preferred solutions or dispersions according to the invention, particular preference is attributed to those of which the hydroxy-functional copolymers contain a) 8 to 35 parts by weight of structural unit Ia

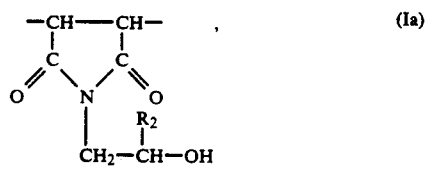

(Ia)

b) 3 to 15 parts by weight of structural units IIa and/or IV, which are at least partly present in neutralized form

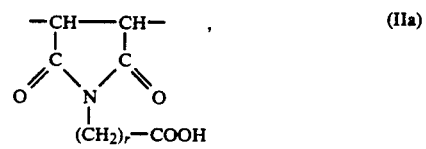

(IIa)

(IV)

c) 5 to 50 parts by weight of structural unit VIa

(VIa)

and d) 20 to 80 parts by weight of structural unit VII, wherein $R_2$ and $R_6$ have the preferred meanings previously set forth and r is an integer from 2 to 12.

The hydroxy-functional copolymers present in the solutions or dispersions according to the invention generally have a number average molecular weight ($M_n$, as determined by gel permeation chromatography using calibrated polystyrenes) of 500 to 30,000, preferably 1,700 to 15,000 and more preferably 2,600 to 10,000; an acid value of 15 to 125, preferably 25 to 75; and a hydroxyl group content of 0.1 to 25% by weight, preferably 0.5 to 6% by weight. In general, 10 to 100%, preferably 30 to 80% of the chemically incorporated carboxyl groups are neutralized with a base, i.e., are present as carboxylate groups. The above ranges regarding acid values apply both to unneutralized and neutralized carboxyl groups.

The anhydride-functional and, optionally, carboxyl-functional copolymers on which the hydroxy-functional copolymers are based have a molecular weight which corresponds to the above-mentioned molecular weight of the hydroxy-functional copolymers minus the molecular weight of the starting materials incorporated into the anhydride-functional copolymers in accordance with the process of the present invention. The anhydride equivalent ratio (quantity in "g" containing 1 mole anhydride groups) of the anhydride-functional copolymers to be used as starting materials in the process according to the invention is 196 to 9,800, preferably 245 to 1.960. The anhydride-functional and, optionally, carboxyl-functional starting materials are prepared in known manner by radically initiated copolymerization, preferably in the presence of organic solvents. The polymerization medium may be any of the solvents typically used in the paint industry which are inert to the monomers and the copolymers under the polymerization conditions.

The anhydride-functional copolymers are generally prepared by copolymerization of the following monomers (the quantities in "parts by weight" are based on 100 parts by weight monomer mixture, i.e., the total of the parts by weight is 100):

a) 1 to 40, preferably 3 to 18 parts by weight of anhydride-functional monomers, b) 1 to 75, preferably 5 to 50 parts by weight of monomers corresponding to formula X

c) 15 to 95, preferably 20 to 80 parts by weight of monomers corresponding to formula XI

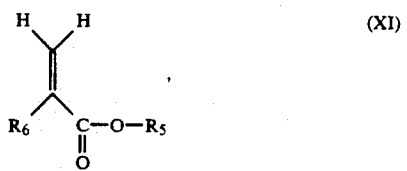

d) 0 to 15, preferably 0 to 5 parts by weight of polyfunctional monomers containing two or more copolymerizable unsaturated bonds and e) 0 to 20, preferably 0 to 10 parts by weight of carboxyl-functional monomers.

Suitable monomers a) include maleic anhydride, itaconic anhydride and citraconic anhydride; maleic anhydride is preferred.

Suitable monomers b) include styrene, vinyl toluene, $\alpha$ methyl styrene, $\alpha$ ethyl styrene, nucleus-substituted diethyl styrenes, isopropyl styrenes, butyl styrenes and methoxystyrenes optionally present in the form of isomer mixtures, ethyl vinyl ether, n-propyl vinyl ether, isopropyl vinyl ether, n-butyl vinyl ether, isobutyl vinyl ether, vinyl acetate, vinyl propionate, vinyl butyrate, 1-octene, 1-decene, 1-hexene, 2-methyl-1-heptene, 2,4,4-trimethyl-1-pentene, 1-nonene, 1-dodecene, 1-tridecene, 1-tetradecene, vinyl cyclohexene, cyclooctene, cyclohexene and mixtures of these monomers. Styrene is preferred.

Suitable monomers c) include methyl acrylate, methyl methacrylate, ethyl acrylate, ethyl methacrylate, n-butyl acrylate, n-butyl methacrylate, isobutyl acrylate, isobutyl methacrylate, tert. butyl acrylate, tert. butyl methacrylate, 2-ethyl hexyl acrylate, 2-ethyl hexyl methacrylate, octyl acrylate, octyl methacrylate, lauryl acrylate, lauryl methacrylate, dodecyl acrylate, dodecyl methacrylate, cyclohexyl acrylate, cyclohexyl methacrylate, benzyl acrylate, benzyl methacrylate, 4-tert. butyl cyclohexyl acrylate, 4-tert. butyl cyclohexyl methacrylate, 3-cyclohexyl propyl-1-methacrylate, 3-methoxybutyl acrylate, 3-methoxybutyl methacrylate, 2-phenyl ethyl acrylate, 2-phenyl ethyl methacrylate, 2,2,3,3-tetrafluoropropyl methacrylate, tetrahydrofurfuryl-2-acrylate, tetrahydrofurfuryl-2-methacrylate and mixtures of these isomers. Methyl methacrylate, n-butyl acrylate, ethyl acrylate, 2-ethyl hexyl methacrylate, n-butyl methacrylate and 2-ethyl hexyl acrylate are preferred.

Suitable monomers d) include hexanediol bis-acrylate, trimethylol propane tris-acrylate, pentaerythritol tris-acrylate, neopentyl glycol bis-acrylate and divinyl benzene.

Suitable monomers e) include acrylic acid, methacrylic acid and maleic acid.

Suitable solvents for carrying out the copolymerization in accordance with the process of the present invention include esters such as butyl acetate, isopropyl acetate, isobutyl acetate, sec.-butyl acetate, amyl acetate, hexyl acetate, ethyl propionate, butyl propionate, isobutyl isobutyrate, methyl glycol acetate, ethyl glycol acetate, butyl glycol acetate, ethoxypropyl acetate, ethyl diglycol acetate, methyl diglycol acetate, butyl diglycol acetate, butyrolactone, propylene glycol methyl ether acetate, oxohexyl acetate (Exxate 600 available from Exxon), and oxoheptyl acetate (Exxate 700 available from Exxon); ethers such as dibutyl ether and dimethyl diglycol; hydrocarbons such as gasoline, turpentine oil, solvent naphtha, terpenes, octane, cyclohexane, toluene, xylene and ethylbenzene; ketones such as acetone, methyl isobutyl ketone, diethyl ketone, cyclohexanone and methyl cyclohexanone; and mixtures of such solvents.

Solvents having a boiling point under ambient conditions of $\geq 110°$ C. and solvents which form an azeotrope with water (such as xylene, butyl acetate, solvent naphtha and oxohexyl acetate) are preferred.

The copolymerization is typically carried out at a solids content of 30 to 95% by weight.

In general, the solvent is completely or partly introduced into the reaction vessel and the monomer mixture, initiator and the remainder of the solvent are continuously added thereto. After the addition, the mixture is stirred. The polymerization is terminated after a monomer conversion of more than 96%, preferably more than 99%. It may be necessary to reactivate the mixture by subsequent addition of small quantities of initiator to obtain the desired monomer conversion. With certain starting monomer mixtures, relatively large quantities of residual monomers may be present in the copolymer after the polymerization. For reasons of cost or in those cases in which the residual monomers adversely affect the desired application or the resulting properties, it is advantageous to reduce this residual monomer content either by distillation or by reactivation with initiator.

The anhydride-functional monomers may be partly introduced with the solvent or may be added dropwise at a faster rate than the other monomers. In certain cases, this modified production process can improve the compatibility or other properties of the binders.

The monomer conversion is determined by analyzing of the solids content of the reaction mixture and verified by gas-chromatographic analysis of the residual monomers.

It is preferred to use radical formers which are suitable for the reaction temperatures of 60° to 180° C. that are generally maintained during the polymerization reaction. Examples of these radical formers include organic peroxides such as dibenzoyl peroxide, di-tert. butyl peroxide, dilauryl peroxide, tert. butyl peroxy-2-ethyl hexanoate, tert. butyl peroxymaleate, tert. butyl peroxy benzoate, dicumyl peroxide and didecanoyl peroxide; and azo compounds such as 2,2'-azo-bis-(2,4-dimethylvaleronitrile), 2,2'-azo-bis-(isobutyronitrile), 2,2'-azo-bis-(2,3-dimethylbutyronitrile), and 1,1'-azo-bis-(1-cyclohexanenitrile).

The initiators may be used in quantities of 1 to 10% by weight, based on the total weight of the monomers. Molecular weight regulators, such as n-dodecyl mercaptan, tert. dodecyl mercaptan, etc., may optionally be used in quantities of up to 5% by weight.

An important aspect of the invention is that the anhydride groups present in the copolymers are converted into imide groups. This is preferably done in 25 to 85% organic solution by reaction with aminoalcohols corresponding to formula VIII and optionally aminocarboxylic acids corresponding to formula IX.

In the context of the invention, the expression "aminoalcohols" also encompasses aminophenols wherein $R_1$ is an aromatic hydrocarbon radical. The "aminoalcohols" have a calculated molecular weight of 61 to 500 and, in addition to a primary amino group, contain at least one to three, preferably one hydroxyl group per molecule.

Suitable aminoalcohols include 2-aminoethanol, 1-aminoethanol, 3-amino-1-propanol, 2-amino-1-propanol, 1-amino-2-propanol, 2-amino-2-methyl-1-propanol, 2-amino-2-methylpropane, 1,3-diol, 2-amino-2-hydroxymethylpropane-1,3-diol, 2-(2-aminoethoxy)-ethanol, 2-amino-1-butanol, 4-amino-1butanol, 1-amino-2-butanol, 1-amino-3-butanol, 3-amino-1-butanol, 2-amino-1-cyclohexanol, 3-amino-1-cyclohexanol, 4-amino-1-cyclohexanol, 2-amino-1-(hydroxymethyl)-cyclopentane, galactosamine, 2-amino-1-hexanol, 6-amino-1-hexanol, 2-amino-1-phenyl-ethanol, 2-amino-3-methyl-1-butanol, 1-(aminomethyl)-cyclohexanol, noradrenalin, 6-amino-2-methyl-2-heptanol, norphenylephedrine, norpseudoephedrine, 2-amino-1-methyl-1-pentanol, 2-amino-4-methyl-1-pentanol, (5-hydroxy-1,3,3-trimethyl-1-cyclohexylmethyl)-amine, 2-(aminomethyl)-3,3,5-triethyl cyclopentanol, 2-amino-1-pentanol, 5-amino-1-pentanol, 2-amino-2-phenylethanol, 2-amino-1-phenylpropane-1,3-diol, 2-amino-1-phenylpropan-1-ol, 2-amino-3-phenylpropan-1-ol, 1-aminopropane-2,3-diol, 2-aminopropane-1,3-diol, 2-aminopropane-1,3-diol, 3,4-dihydroxynorephedrine, 4-aminophenol, 2-(4-aminophenoxy)-ethanol, 4-aminobenzyl alcohol, 3-aminobenzyl alcohol, 2-aminobenzyl alcohol, 2-amino-9-fluorenol, 1-amino-3-hydroxypyridine, 2-amino-1-(4-hydroxy-3-methoxyphenyl)-ethanol, 1-amino-2-naphthol, 1-amino-4-naphthol, 1-amino-7-naphthol, 2-amino-3-naphthol, 2-amino-1-(4-nitrophenyl)-propane-1,3-diol, 1-(3-aminophenyl)-ethanol, 2-(2-aminophenyl)-ethanol, 2-(4-aminophenyl)-ethanol, 2-((3-aminopropyl)-methylamino)-ethanol and mixtures thereof.

The preferred aminoalcohols are those corresponding to formula VIII wherein
$R_1$ represents a $C_{2-13}$ aliphatic hydrocarbon radical and
n is an integer from 1 to 3.

Particularly preferred aminoalcohols are those corresponding to formula VIII wherein
$R_1$ represents an ethylene or 1,2-propylene group and n is 1, and if $R_1 = 1,2$-propylene
the hydroxyl group is attached to the secondary carbon atom.

Accordingly, particularly preferred aminoalcohols are aminoethanol and 1-amino-2-propanol.

When the process according to the invention is carried out without using aminocarboxylic acids IX, the anhydride-functional copolymers and aminoalcohols are generally used in such quantities that, for every anhydride group, there are 0.8 to 2.0, preferably 1.0 to 1.5 and more preferably 1.0 to 1.1 amino groups of the aminoalcohol.

Preferred solvents for the imidization reaction are those preferably used for the production of the anhydride-functional copolymers.

The process according to the invention may be carried out, for example, by heating the aminoalcohol component, optionally together with suitable solvents, to a temperature of $\geq 100°$ C. and then adding the dissolved anhydride-functional copolymer at a temperature of 100° to 200° C., preferably 120° to 148° C. The reaction may be controlled in such a way that the water of reaction is distilled off azeotropically via a water separator at the same time as the polymer is being added. In one variant of the process, the anhydride-functional copolymer may first be completely added and the water of reaction subsequently removed.

Removal of the water of reaction is continued at 100 to 200° C., preferably 120° to 148° C. until either the theoretical quantity of water has been removed or no more water is removed.

When anhydride-functional copolymers and aminoalcohols are mixed, highly viscous intermediate products may be formed depending upon the reaction conditions, particularly when anhydride-functional copolymers of high molecular weight and/or high anhydride equivalent weight are used. In these cases, it is advisable to keep the increase in viscosity under control by suitable process variants, for example by working at a low concentration of the reaction solution. The viscosity is reduced to a relatively low level during the reaction.

With certain copolymers and when an excess of aminoalcohol is used, the anhydride-functional polymer may also be initially introduced and the aminoalcohol added thereto. Whether a copolymer is suitable for this purpose is something to be determined in a preliminary test because, in these embodiments of the process, gel particles can be formed under adverse conditions.

On completion of the imidization reaction, excess aminoalcohol may, if necessary, be removed from the end product by brief distillation, preferably azeotropically with a suitable solvent.

Small quantities of stabilizers (such as triphenyl phosphite, phosphorous acid, dicyclopentadiene, anthracene and isoprene) may be added during the imidization reaction, for example, to reduce discoloration reactions.

The carboxyl groups required to obtain dilutability with water may be incorporated into the polymer in several ways. One possibility is to use carboxyl-functional monomers e) in the preparation of the anhydride-functional copolymers (incorporation of structural units IV or V), as mentioned above. Another possibility is to subject some of the anhydride groups present in the copolymer to hydrolytic ring opening. This may be done, for example, by reacting a portion of the anhydride groups with a calculated quantity of water at 60° to 100° C. (formation of structural units V). This reaction may optionally be conducted in the presence of a catalytic quantity of a tertiary amine (for example 0.01 to 0.3% by weight), such as triethylamine or triethylene diamine. Another possibility is to use aminocarboxylic acids IX in the imidization reaction in which case the original anhydride groups are partly converted into imide carboxyl groups (structural units II).

Suitable aminocarboxylic acids include aminoacetic acid, 2-aminopropanoic acid, 3-aminopropanoic acid, 4-aminobutanoic acid, 5-aminopentanoic acid, 6-aminohexanoic acid, 5-aminohexanoic acid, 8-aminooctanoic acid, 10-aminodecanoic acid, 4-aminobenzoic acid, 1-aminocyclohexane carboxylic acid and mixtures of these and other aminocarboxylic acids.

Preferred aminocarboxylic acids IX include those wherein
$R_1$ represents an aliphatic, preferably linear, $C_{2-12}$ hydrocarbon radical and
m is 1 or 2, preferably 1.

Accordingly, the aliphatic monoamine monocarboxylic acids set forth in the preceding paragraph are particularly preferred aminocarboxylic acids.

If the carboxyl groups are to be at least partially incorporated into the copolymers through the use of aminocarboxylic acids, it is important to ensure that a sufficiently high concentration of anhydride groups is available for the reaction with the amino groups of the aminocarboxylic acids. This may be done, for example, by carrying out the modification of the anhydride-functional copolymers with the aminocarboxylic acids either 1) before the modification with the aminoalcohols while maintaining a large excess of anhydride groups to the amino groups of the aminocarboxylic acids, or 2) when the aminoalcohols and aminocarboxylic acids are simultaneously used, by minimizing the excess of amino groups over anhydride groups.

Another less preferred method of introducing carboxyl groups into the polymer is an incomplete imidization reaction during the reaction of anhydride groups with the aminoalcohols such that structural units III are partly formed. These structural units are obtained, for example, by terminating the imidization reaction before the theoretical quantity of water has been eliminated.

As previously mentioned, the quantity of carboxyl groups incorporated into the copolymers by these methods is selected such that the polymers have an acid value of 15 to 125, preferably 20 to 75, based on resin solids.

In another embodiment of the process according to the invention, the hydroxy-functional copolymers are modified by a reaction with lactones before they are dissolved or dispersed in water; the reaction is accompanied by opening of the lactone ring and chain extension.

Suitable lactones include those containing 3 to 15 carbon atoms in the ring. The rings may even have different substituents. Preferred lactones are δ-butyrolactone, δ valerolactone, ε caprolactone, β-hydroxy-β-methyl-δ valerolactone.

The lactones may be used in quantities of 0.05 to 5.0 moles, preferably 0.25 to 2.5 moles of lactone per mole of hydroxyl groups in the polyimide copolymer. The reaction is carried out, for example, over a period of 0.5 to 5 hours at 100° to 150° C., optionally in the presence 0.01 to 1.0% of suitable catalysts (such as p-toluenesulfonic acid, dibutyl tin dioxide and dibutyl tin dilaurate. The modification reaction with the lactones may also be carried out in the presence of the previously mentioned solvents.

The next step of the process according to the invention comprises neutralizing the hydroxy-functional copolymers, which are generally dissolved in the previously mentioned organic solvents and which may have been modified with lactones, by the addition of a neutralizing agent and then dissolving or dispersing the copolymers thus neutralized in water. The neutralizing agent is used in quantities such that 20 to 100%, preferably 35 to 80%, of the carboxyl groups present are neutralized. The neutralization step may be carried out before the addition of water or even during the addition of water using aqueous solutions of the neutralizing agent. If desired, other solvents may be added to the solutions of the copolymers before neutralization. Such solvents include N-methyl pyrrolidone, N,N'-dimethyl propylene urea, ethanol, propanol, butanol, pentanol, hexanol, methoxybutanol, diacetone alcohol, methyl glycol, ethyl glycol, butyl glycol, methyl diglycol, ethyl diglycol, butyl diglycol, propylene glycol monomethyl ether, methoxypropanol, N-methyl caprolactone, N,N'-dimethyl imidazolidinone and mixtures of these solvents.

Suitable neutralizing agents include ammonia, triethylamine, diethanolamine, methyl diethanolamine, 2-amino-2-methyl-1-propanol, dimethyl ethanolamine, N-methyl morpholine, sodium hydroxide and potassium hydroxide.

As to whether the aqueous systems are (optionally colloidal) solutions or dispersions depends upon the molecular weight of the dissolved or dispersed particles and, in particular, upon their content of carboxyl groups. The aqueous systems are preferably dispersions.

After the dissolving or dispersing step, the organic solvent present is distilled off, preferably azeotropically with water. The distillation step can be accelerated by an inert gas stream (for example nitrogen) or by applying a vacuum. Distillation is generally continued until no more azeotropic mixture is formed. The aqueous solution or dispersion is diluted to a ready-to-use viscosity by addition of water or by the addition of other neutralizing agents. The total quantity of water is generally selected such that 20 to 45% by weight solutions or dispersions of the copolymers are ultimately obtained.

The solutions or dispersions according to the invention may be combined with suitable hydroxyl-reactive crosslinking resins to form ready-to-use binder mixtures. These binder mixtures generally contain, based on solids,
a) 30 to 98, preferably 60 to 95, parts by weight of the hydroxy-functional polyimide copolymers according to the invention and
b) 2 to 70, preferably 5 to 40, parts by weight of one or more crosslinking resins.

The crosslinking resins b) may be water dilutable or water-dispersible substances, although hydrophobic substances which cannot be dispersed in water on their own may also be used as crosslinking resins because the resins a) can perform the function of an emulsifier for the crosslinking resins b).

Suitable crosslinking resins b) include water dilutable or water dispersible melamine- or urea-formaldehyde condensates, for example, those described in D. H. Solomon, The Chemistry of Organic Filmformers, pages 235 et seq., John Wiley & Sons, Inc., New York, 1967. However, the melamine resins may also be completely or partly replaced by other crosslinking aminoplasts, for example, those described in Houben-Weyl, "Methoden der Organischen Chemie", Vol. 14/2, Part 2, 4th Edition, Georg-Thieme-Verlag, Stuttgart, 1963, pages 319 et seq.

Other suitable crosslinking resins include blocked polyisocyanates based on monomeric polyisocyanates such as isophorone diisocyanate, hexamethylene diisocyanate, 1,4-diisocyanatocyclohexane, bis-(4-isocyanatocyclohexyl)-methane, 2,4-diisocyanato-1-methylbenzene, bis-(4-isocyanatophenyl)-propane, and tris-(4-isocyanatophenyl)-methane. Also suitable for forming the blocked polyisocyanates are polyisocyanates adducts such as biuret-modified polyisocyanates prepared from 1,6-diisocyanatohexane; isocyanurate-modified polyisocyanates prepared from 1,6-diisocyanatohexane; and urethane group-containing polyisocyanates prepared by reacting 2,4- and/or 2,6-diisocyanatotoluene or isophorone diisocyanate with low molecular weight polyhydroxyl compounds such as trimethylol propane, the isomeric propanediols or butanediols and mixtures of such polyhydroxyl compounds.

Suitable blocking agents for blocking these polyisocyanates include monohydric alcohols such as methanol, ethanol, butanol, hexanol, cyclohexanol and benzyl alcohol; oximes such as acetone oxime and methyl ethyl ketoxime; lactams such as ε caprolactam; and phenols.

Preferred crosslinking resins are melamine and urea resins, more preferably alkylated melamine-formaldehyde resins containing 1 to 8 carbon atoms in the alkyl chain, such as butylated and/or methoxymethylated melamine resins.

The aqueous solutions or dispersions according to the invention or mixtures thereof with the previously mentioned crosslinking resins may be used for the production of coating compositions, sealants or adhesives. Their preferred application is for the production of coating compositions. The aqueous solutions or dispersions or mixtures thereof with crosslinking resins may optionally contain the auxiliaries and additives typically used in paint technology such as known pigments and fillers, which may be used in quantities of 30 to 180% by weight, based on binder solids. Examples of suitable pigments and fillers include titanium dioxides, iron oxides, zinc oxides, calcium and magnesium silicates, aluminum bronze, carbon black, lime and organic dyes and pigments such as azo dyes and phthalocyanine complexes. Other known additives (such as antioxidants, flow control agents, foam inhibitors, UV absorbers, anti-sedimenting agents, etc.) may also be used in the coating compositions according to the present invention.

Coating compositions containing mixtures of the hydroxy-functional copolymers and crosslinking resins as binder are suitable for the coating all types of heat-resistant substrates such as iron, steel, aluminum, titanium, magnesium, other metals, paper and plastics films.

The coating compounds may be applied by standard methods. Evaporation of the water results in coatings which may be cured at 90° to 180° C. to form high-quality paint films.

In the following examples, all parts and percentages are by weight unless otherwise indicated.

EXAMPLES

Example 1 a) 983 g solvent naphtha and 983 butyl acetate were introduced under nitrogen into a 5 liter reactor equipped with a stirrer and with a cooling and heating system and heated to 125° C. A mixture of 200 g maleic anhydride, 380 g methyl methacrylate, 600 g butyl acrylate, 140 g acrylic acid, 400 g 2-ethylhexyl acrylate and 200 g styrene was then added over a period of 3 hours while 114 g tert. butyl peroctoate (70% solution in a mixture of hydrocarbons) was added at the same time over a period of 3.5 hours. After stirring for an additional 2 hours, an approximately 50% carboxyl- and anhydride-functional copolymer having an anhydride equivalent weight of 980 g (based on solids) was obtained.

b) 151.2 g 1-amino-2-propanol and 585 g solvent naphtha were introduced under nitrogen into a 5 liter reactor equipped with a stirrer and with a heating and cooling system and heated to 140° C. 3,600 g of the anhydride-functional copolymer solution were added over a period of 1 hour. The reaction mixture was then kept at 140° to 148° C. for about 5 hours during which time the water of reaction was removed.

The resin solution was then dispersed in a mixture of 60.3 g dimethyl ethanolamine and 3700 g water, the organic solvents were azeotropically distilled off and, at the end of distillation, another 900 g water were added.

An aqueous dispersion according to the invention of a hydroxy-functional copolymer having a solids content of 36%, an acid value of the dispersed solid of 56 and a degree of neutralization of the carboxyl groups of 39% (degree of neutralization=percentage of carboxyl groups converted into carboxylate groups by neutralization) was obtained. The solid contained 15% of the following structural unit:

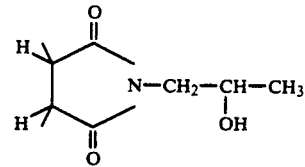

Example 2 a) 983 g solvent naphtha and 983 g butyl acetate were introduced under nitrogen into a 5 liter reactor equipped with a stirrer and with a cooling and heating system and heated to 125° C. A mixture of 300 g maleic anhydride, 180 g methyl methacrylate, 500 g butyl acrylate, 140 g acrylic acid, 500 g 2-ethylhexyl acrylate and 300 g styrene was then added over a period of 3 hours while 114 g tert. butyl peroctoate (70% in a mixture of hydrocarbons) were simultaneously added over a period of 3.5 hours. After stirring for another 2 hours at 125° C., an approximately 50% carboxyl- and anhydride-functional copolymer having an anhydride equivalent weight of 654 g (100%) was obtained.

b) 101.2 g 1-amino-2-propanol and 281 g solvent naphtha were introduced into a 2 liter reactor equipped with a stirrer, a cooling and heating system and a water separator and heated to 140° C. 1,600 g of the anhydride-functional copolymer 2a) were added over a period of 2 hours at 140° C. and the reaction mixture was heated on the water separator until the product had an acid value of 54.

The resin solution was then dispersed in a mixture of 28.5 g dimethyl ethanolamine and 2500 g water and the organic solvent was azeotropically distilled off.

After the addition of water the aqueous dispersion had a solids content of 37.5%. The polymer has an acid number of 54 (based on solids) and a degree of neutralization of 41%. The dispersed solid contained 20% of the structural unit set forth in Example 1.

Example 3

54.8 g aminoethanol and 245 g solvent naphtha were introduced into a 2 liter reactor equipped with a stirrer and with a cooling and heating system and heated to 140° C. 1,600 g of the anhydride-functional copolymer 1a) were then added over a period of 1 hour and the reaction mixture was heated on a water separator until no more water was removed. The resin solution was dispersed in a mixture of 26.8 g dimethyl ethanolamine and 1,900 g water and the organic solvent was then azeotropically distilled off. After the addition of water the aqueous dispersion had a solids content of 36%. The polymer has an acid value of 70 (based on solids) and a degree of neutralization of 30%. The dispersed solid contained 14% of the following structural unit:

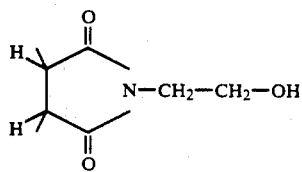

Example 4 a) 1,980 g xylene were heated under nitrogen to 120° C. in a 5 liter reactor equipped with a stirrer and with a heating and cooling system. A mixture of 230 g maleic anhydride, 1,120 g methyl methacrylate, 300 g 2-ethylhexyl acrylate and 300 g styrene was then added over a period of 3 hours while 71 g tert. butyl peroctoate (70% solution in hydrocarbons) was simultaneously added over a period of 3.5 hours. After stirring for 2 hours, a 50% anhydride-functional copolymer having an anhydride equivalent weight of 852 (based on solids) was obtained.

b) 13.8 g 1-amino-2-propanol, 24.2 g 6-aminohexanoic acid and 113.2 g xylene were introduced into a 1 liter reactor equipped with a stirrer, a heating and cooling system and a water separator and heated to 132° C. 600 g of the anhydride-functional copolymer 4a) were then added over a period of 1 hour and the reaction mixture was heated on the water separator until no more water was removed. The resin solution was then dispersed in a mixture of 10.8 g dimethyl ethanolamine and 600 g water. The organic solvent was distilled off and the binder dispersion was adjusted to a solids content of 34% by the addition of water. The polymer had an acid value of 45 and a degree of neutralization of 45%. The dispersed polymer contained approximately 8.5% of the structural unit set forth in Example 1.

Example 5 a) 16.8 g 1-amino-2-propanol and 65 g solvent naphtha were introduced under nitrogen into a 1 liter reactor equipped with a stirrer, a heating and cooling system and a water separator and heated to 120° C. 400 g of the anhydride-functional and carboxyl-functional copolymer of Example 1) were then added over a period of 1 hour and the reaction mixture was heated until no more water was removed. The polymer solution was then cooled to 120° C. and reacted for 3 hours with 23.2 g ε caprolactone in the presence of 0.24 g dibutyl tin dilaurate.

The resin was then dispersed in a mixture of 600 g water and 12 g dimethyl ethanolamine, the organic solvent was distilled off and the polymer dispersion was adjusted to a solids content of 27.5% by the addition of water. The polymer had an acid value of 55 (based on solids) and a degree of neutralization of 70%. The dispersed solid contained approximately 23% of the following structural units

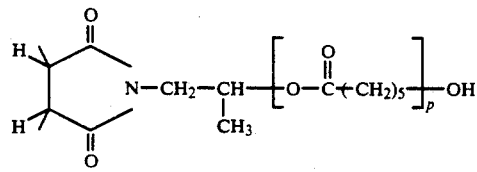

where p has a statistical average value of 1.

Example 6 a) 300 g oxohexyl acetate (Exxate 600) were heated to 140° C. in a 2 liter reactor equipped with a stirrer and with a cooling and heating system. A mixture of 160 g maleic anhydride, 160 g methyl methacrylate, 208 g butyl acrylate, 80 g 2-ethylhexyl methacrylate and 160 g styrene was then added under nitrogen over a period of 3 hours while a mixture of 45.9 g tert. butyl peroctoate (70% in a mixture of hydrocarbons) and 29 g oxohexyl acetate was added at the same time. After stirring for 2 hours at 40° C., an anhydride-functional copolymer was obtained in the form of a 70% solution having an anhydride equivalent weight of 490 g, based on solids.

b) 88.6 g oxohexyl acetate, 14.4 g 1-amino-2-propanol and 12.6 g 6-aminohexanoic acid were introduced at 130° C. into a 0.5 liter reactor equipped with a stirrer and with a cooling and heating system and 250 g of the anhydride-functional copolymer 6a) were then introduced. The reaction was continued until no more water was removed, after which the reaction mixture was dispersed in a mixture of 6.3 g dimethyl ethanolamine and 360 g water. After the organic solvent had been azeotropically distilled off, the aqueous binder dispersion was adjusted with water to a solids content of 27%. The polymer had an acid value of 48 (based on solids) and a degree of neutralization of 50%. The dispersed solid contained approximately 21% of the structural unit set forth in Example 1.

Example 7 a) In a 4 liter reactor equipped with a stirrer and with a cooling and heating system, 1,300 g xylene were heated under nitrogen to a temperature of 120° C. A mixture of 300 g maleic anhydride, 600 g butyl acrylate, 420 g 2-ethylhexyl acrylate and 600 g styrene was added over a period of 3 hours while 114 g tert. butyl peroctoate were simultaneously added over a period of 3.5 hours. After stirring for an additional 2 hours, an approximately 60% anhydride-functional copolymer having an anhydride equivalent weight of 654 g (based on solids) was obtained.

b) 29.6 g 1-amino-2-propanol, 23.6 g 6-aminohexanoic acid and 265 g xylene were introduced into a 1 liter reactor equipped with a stirrer, a cooling and heating system and water separator, 300 g of the anhydride-functional copolymer 6a) were introduced over a period of 1 hour at 130° C. and the reaction mixture was heated until the removal of water was complete. The resin was then dispersed in a mixture of 700 g water and 16 g dimethyl ethanolamine.

After the xylene had been distilled off, 21 g butyl glycol were added and the resin dispersion was adjusted to a solids content of 25% by the addition of water. The polymer had an acid value of 32 (based on solids) and a degree of neutralization of 90%. The dispersed solid contained 15% of the structural unit set forth in Example 1.

The binder dispersions prepared in accordance with Examples 1 to 7 were mixed with an amino crosslinking resin (melamine resin Sacopal M 232, a product of Krems Chemie) in a ratio by weight of 80:20 and the resulting mixtures were applied to degreased steel sheets. The wet film thickness was 180 μm and the dry film thickness was approx. 25 to 30 μm. After airing for 10 minutes at room temperature, the coatings were stoved for 30 minutes at 150° C. Clear, hard, crosslinked films were obtained after cooling. All the coatings passed a wiping test with a cotton wool plug impregnated with methyl isobutyl ketone (at least 200 double rubs).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous solution or dispersion of hydroxy-functional copolymers wherein the copolymers contain per 100 parts by weight a) 1 to 70 parts by weight of structural unit I

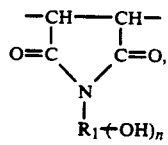

(I)

b) a total of 2 to 25 parts by weight of structural units II, III, IV and/or V, which are at least partly present in neutralized form

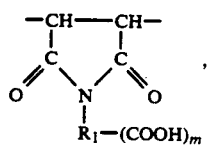

(II)

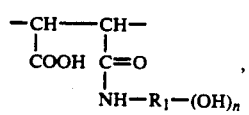

(III)

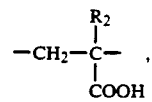

(IV)

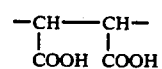

(V)

c) 1 to 75 parts by weight of structural unit VI

(VI)

d) 15 to 95 parts by weight of structural unit VII

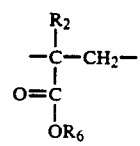

(VII)

and e) 0 to 15 parts by weight of other structural units derived from polyolefinically unsaturated monomers, wherein the sum of components a) to e) is 100, based on the total weight of components a) to e), and wherein n is 1, 2 or 3, m is 1 or 2, $R_1$ represents an aliphatic, cycloaliphatic, araliphatic or aromatic $C_{2-20}$ hydrocarbon radical which may contain one or more fluorine or chlorine heteroatoms, or one or more oxygen or nitrogen heteratoms in the form of ether, ester, amide, imide, urethane, urea, keto and nitrile groups, $R_2$ represents hydrogen or a methyl group, $R_3$ represents an aliphatic $C_{2-15}$ hydrocarbon radical, a cycloaliphatic $C_{5-10}$ hydrocarbon radical, an arliphatic $C_{7-18}$ hydrocarbon radical, an aromatic $C_{6-12}$ hydrocarbon radical, chlorine, fluorine, a nitrilo group or a $C_{2-12}$ hydrocarbon radical containing one or more oxygen, sulfur or nitrogen heteroatoms in the form of ether, ester, amide, urethane, urea, thioester, thioether, oxirane, ketone, lactam or lactone groups, $R_4$ represents hydrogen or, together with $R_3$ and the two carbon atoms of structural unit VI represents a cycloaliphatic radical, $R_5$ represents hydrogen, a methyl or ethyl group, chlorine or fluorine and $R_6$ represents an aliphatic or cycloaliphatic $C_{1-18}$ hydrocarbon radical optionally containing oxygen, sulfur or nitrogen heteroatoms.

2. The aqueous solution or dispersion of claim 1 wherein the copolymers contain per 100 parts by weight a) 8 to 35 parts by weight of structural unit I, b) a total of 3 to 15 parts by weight of structural units II, III, IV and/or V, which are at least partly present in neutralized form, c) 5 to 50 parts by weight of structural unit VI and d) 20 to 80 parts by weight of structural unit VII, wherein the sum of components a) to d) is 100, based on the total weight of components a) to d), and wherein n is 1, 2 or 3, m is 1, $R_1$ represents an aliphatic $C_{2-12}$ hydrocarbon radical optionally containing ester groups, $R_2$ represents hydrogen or a methyl group, $R_3$ represents an optionally substituted phenyl radical, $R_4$ represents hydrogen, $R_5$ represents hydrogen or a methyl group and $R_6$ represents an aliphatic $C_{1-10}$ hydrocarbon radical optionally containing one or more oxygen heteroatoms.

3. The aqueous solution or dispersion of claim 2 wherein the copolymers contain per 100 parts by weight a) 8 to 35 parts by weight of structural unit Ia

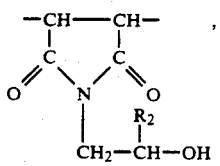   (Ia)

b) 3 to 15 parts by weight of structural unit IIa and/or IV, which is at least partly present in neutralized form

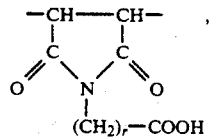   (IIa)

c) 5 to 50 parts by weight of structural unit VIa

and d) 20 to 80 parts by wight of structural units VII, wherein the sum of the parts by weight of components a) to d) is 100 and wherein r is an integer from 2 to 12.

4. The aqueous solution or dispersion of claim 1 wherein the copolymers have a number average molecular weight ($M_n$) of 2,600 to 10,000, an acid value, based on neutralized and unneutralized carboxyl groups, of 20 to 75 and a degree of neutralization of the carboxyl groups of 30 to 80%.

5. The aqueous solution or dispersion of claim 2 wherein the copolymers have a number average molecular weight ($M_n$) of 2,600 to 10,000, an acid value, based on neutralized and unneutralized carboxyl groups, of 20 to 75 and a degree of neutralization of the carboxyl groups of 30 to 80%.

6. The aqueous solution or dispersion of claim 3 wherein the copolymers have a number average molecular weight ($M_n$) of 2,600 to 10,000, an acid value, based on neutralized and unneutralized carboxyl groups, of 20 to 75 and a degree of neutralization of the carboxyl groups of 30 to 80%.

* * * * *